United States Patent [19]
Witter

[11] Patent Number: 5,627,835
[45] Date of Patent: May 6, 1997

[54] ARTIFICIAL WINDOW SIZE INTERRUPT REDUCTION SYSTEM FOR CDMA RECEIVER

[75] Inventor: Robert C. Witter, Lawrenceville, Ga.

[73] Assignee: OKI telecom, Suwanee, Ga.

[21] Appl. No.: 416,053

[22] Filed: Apr. 4, 1995

[51] Int. Cl.[6] .................................................. H04B 1/76
[52] U.S. Cl. .......................... 370/320; 370/500; 370/520
[58] Field of Search ...................................... 375/205, 206, 375/354, 356, 342; 370/69.1, 74, 95.1, 95.3, 98, 100.1, 105.5, 18; 379/59, 60; 455/33.1, 33.2, 51.1, 67.4

[56] References Cited

U.S. PATENT DOCUMENTS

| | | | |
|---|---|---|---|
| 5,267,261 | 11/1993 | Blakeney, II et al. ................ | 455/33.1 |
| 5,416,797 | 5/1995 | Gilhousen et al. ....................... | 370/18 |
| 5,490,165 | 2/1996 | Blakeney, II et al. ................. | 375/205 |

OTHER PUBLICATIONS

"Mobile Station–Base Station Compatibility Standard for Dual–Mode Wideband Spread Spectrum Cellular System" TIA/EIA/IS–95 Interim Standard—Sections 6.6 and 7.7.2.3.2.1—IS–95, Jul. 1993.

Primary Examiner—Benedict V. Safourek
Assistant Examiner—Chau T. Nguyen
Attorney, Agent, or Firm—Louis T. Isaf, P.C.; Jeffrey R. Kuester

[57] ABSTRACT

A method and an apparatus for searching code division multiple access pilot signal energies includes limiting a pilot signal window size above a lower limit and only analyzing search result data corresponding to an instructed pilot signal window size. A central processing unit instructs a searcher receiver within a mobile station modem application specific integrated circuit to search for pilot signal energies within an instructed pilot signal search window unless the instructed pilot signal window size is smaller than a pilot signal window size lower limit. In such a case, the pilot signal search window size is artificially designated as the pilot signal window size lower limit to prevent excessive search completion interrupts from over utilizing central processing unit resources. The central processing unit analyzes only the middle search results corresponding to the pilot signal window size as instructed from the base station to maintain the ability of effectively searching pilot signal window sizes smaller than the pilot signal window size lower limit.

6 Claims, 3 Drawing Sheets

ARTIFICIAL WINDOW SIZE INTERRUPT REDUCTION SYSTEM FOR CDMA RECEIVER

BACKGROUND OF THE INVENTION

The present invention relates generally to the field of radio communication, and more specifically, to the field of pilot signal search window control in code division multiple access (CDMA) cellular telephones.

The primary standard specification relevant to the present invention is TIA/EIA/IS-95 Mobile Station-Base Station Compatibility Standard for Dual-Mode Wideband Spread Spectrum Cellular System. This industry standard specification is considered understood by those reasonably skilled in the art of the present invention. Specific sections of relevance include all of section 6.6, with particular emphasis on sections 6.6.6.1–6.6.6.2.3, and section 7.7.2.3.2.1.

After a mobile station acquires a pilot signal from a base station, the base station continually instructs the mobile station to search at specific locations in time for pilot channel CDMA energy from both the present base station and other base stations. Other energy from the present base station is important since CDMA systems are able to diversity combine multipath reflections of the same signal into usable energy through the use of multiple digital receivers, often referred to as demodulating "fingers". In addition, information about the time location of other base stations is important from a cellular soft-handoff standpoint. Besides providing the specific locations to search for pilot signal energy, the base station also provides the mobile station a search window size for each pilot signal. The available search window sizes range from 4 chips up to 452 chips. Thus, the time range around each specific time location is defined by the base station as a search window size.

One physical implementation of CDMA searching mechanisms includes using a mobile station modem application specific integrated circuit (MSM ASIC) and a central processing unit (CPU) with access to memory and a direct memory access controller (DMA controller). Such an MSM ASIC includes a searcher receiver and multiple digital receivers, all of which are controlled through control registers accessible by the CPU. As a pilot search is performed, result data is stored directly into the CPU memory through the DMA controller. After the search is complete, an interrupt is generated which causes the CPU to analyze the result data and re-assign the digital receivers as necessary. Additionally, a search for the next pilot signal is also initiated.

Unfortunately, one of the problems associated with such an implementation relates to CPU processing availability. When search windows are small, the CPU is more often required to respond to search completion interrupts and analyze result data. Thus, this process can utilize too much CPU processing time and resources. One way of addressing the problem of having too many search completion interrupts would be to simply override the recommended search size by requiring that all searches be larger than a predefined amount. However, simply overriding the search window sizes recommended by the base station would defeat the reasons for having small search windows. One of these purposes is to restrict each search to isolating a single pilot signal. Thus, for areas with high densities of base stations, it would be difficult to prevent interference between the base stations without the benefit of smaller search windows. Another way of addressing the problem would be to introduce a delay between searches. Unfortunately, implementation of a timer to accomplish such a delay would also add an extra degree of complexity to CPU operation.

There is, therefore, a need in the industry for a method and an apparatus for addressing these and other related, and unrelated, problems.

SUMMARY OF THE INVENTION

A method and an apparatus for searching code division multiple access pilot signal energies includes limiting a pilot signal window size above a lower limit and only analyzing search result data corresponding to an instructed pilot signal window size. A central processing unit instructs a searcher receiver within a mobile station modem application specific integrated circuit to search for pilot signal energies within an instructed pilot signal search window unless the instructed pilot signal window size is smaller than a pilot signal window size lower limit. In such a case, the pilot signal search window size is artificially designated as the pilot signal window size lower limit to prevent excessive search completion interrupts from over utilizing central processing unit resources. The central processing unit analyzes only the middle search results corresponding to the pilot signal window size as instructed from the base station to maintain the ability of effectively searching pilot signal window sizes smaller than the pilot signal window size lower limit.

It is, therefore, an object of the present invention to provide a method and an apparatus for limiting a pilot signal window size above a lower limit and only analyzing search result data corresponding to an instructed pilot signal window size.

Another object of the present invention is to provide a system for reducing search completion interrupts by overriding pilot signal search window size instruction information from a base station.

Yet another object of the present invention is to provide a system for simultaneously searching for spread spectrum pilot signal energy and analyzing search results of a previous search which minimizes processing resources.

Still another object of the present invention is to provide a process for sequentially searching for pilot signal energies which includes a window size lower limit.

Still another object of the present invention is to provide a CDMA cellular telephone which limits pilot signal search window sizes to being above a defined lower limit regardless of contrary instructions from a base station and which discards data outside a middle range corresponding to an instructed smaller window size.

Other objects, features and advantages of the present invention will become apparent upon reading and understanding the present specification, when taken in conjunction with the accompanying drawings.

DETAILED DESCRIPTION OF THE PREFERRED EMBODIMENT

Figure 1:
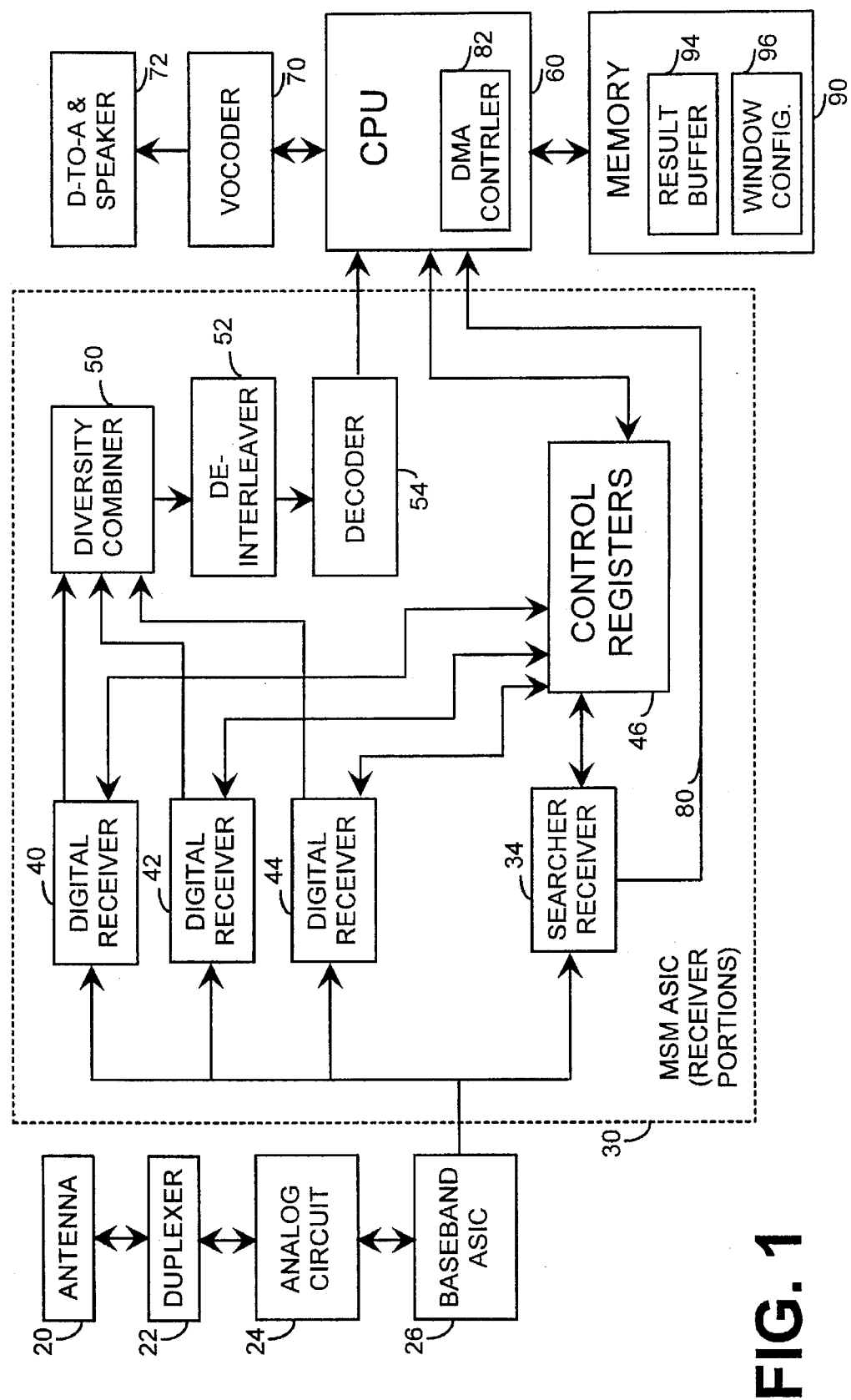
FIG. 1 is a block diagram representation of receiver portions of a CDMA telephone in accordance with the preferred embodiment of the present invention.

Referring now in greater detail to the drawings in which like numerals represent like components throughout the several views, FIG. 1 shows an antenna 20 of a code division multiple access (CDMA) cellular telephone for receiving a spread spectrum cellular radio signal from a base station. A duplexer 22 directs the received signal into an analog circuit 24, a baseband application specific integrated circuit (ASIC) 26, and a mobile station modem (MSM) ASIC 30, for which only selected receiver portions are represented in FIG. 1. As would be understood by those skilled in the art of the present invention, the analog circuit 24 provides conventional analog functionality, such as radio frequency-to-intermediate frequency downconverting, filtering, and automatic gain control functions, and the baseband ASIC 26 provides conventional baseband signal processing, including analog-to-digital conversion.

As the MSM ASIC 30 receives the digital received data stream from the baseband ASIC 26, it is analyzed by a searcher receiver 34 and three digital receivers 40, 42, and 44. As configured by settings in control registers 46, the digital receivers 40, 42, and 44, also known as "demodulating fingers", demodulate multi-path information which is subsequently combined into a combined signal by a diversity combiner 50 before being de-interleaved by a de-interleaver 52 and decoded by a decoder 54 before being output to a CPU 60. Voice information included in the information output from the MSM ASIC 30 is then output to a vocoder 70 which vocodes the data and provides the vocoded information to a digital-to-analog converter and speaker 72 for audible output.

As discussed in greater detail below, control information included in the information output from the MSM ASIC 30 to the CPU 60 is used by the CPU 60 to, in part, configure the control registers 46. This control registers 46 information is used by the searcher receiver 34 which searches for pilot signal energies and, after a search is complete, outputs search result information through a searcher receiver output channel 80 to a specific section of the CPU 60 called a direct memory access (DMA) controller 82. Through the DMA controller 82, the search result information is stored in memory 90. A result buffer 94 is defined in the memory 90 for storing the search result information from the DMA controller 82. Another area of memory 90 shown as window configuration memory area 96 is also defined to store sizes and locations of pilot signal search windows as instructed from the base station.

The following describes examples of acceptable elements in accordance with the preferred embodiment of the present invention. Except for the internal configuration modifications discussed herein (programming, etc.), prior art examples of an acceptable CPU 60, and baseband ASIC 26, and MSM ASIC 30 are, respectively, the 80C186 microprocessor available from Advanced Micro Devices of Sunnyvale, Calif., the Q53101-1S2 baseband ASIC available from Qualcomm, Inc. of San Diego, Calif., and the Q52501-1S2 MSM also available from Qualcomm, Inc.

Figure 2:
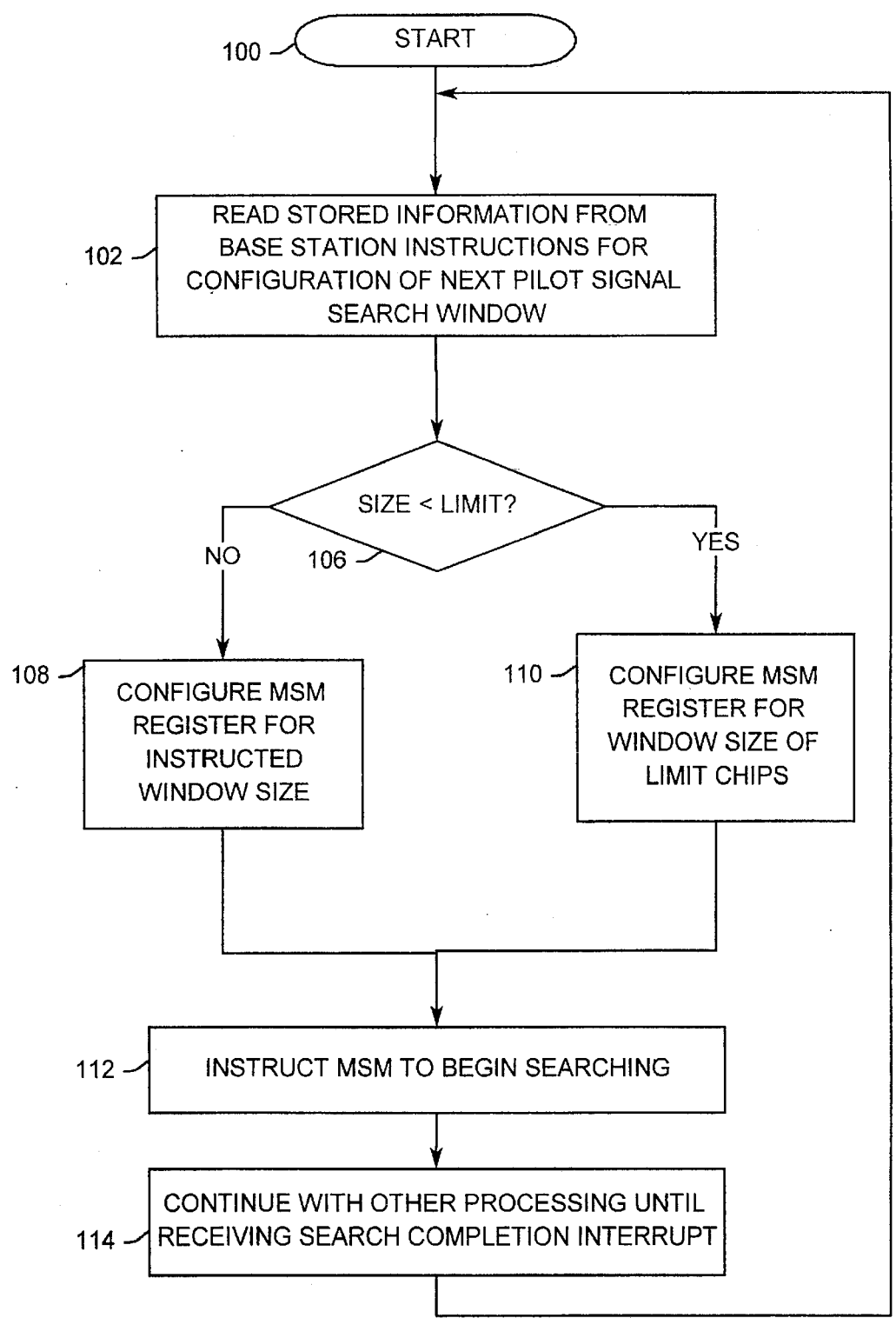
FIG. 2 is a flow chart representation of a pilot signal search control process for the elements shown in FIG. 1.

Refer now also to FIG. 2 for a flow chart representation of a pilot signal search control process for the elements shown in FIG. 1. After the process starts at step 100, the CPU 82 reads the window configuration memory area 96 in step 102 to determine the instructed configuration (location and size) for the next pilot signal search window. As would be understood by one reasonably skilled in the art of the present invention, the location and size for each pilot signal search window are denoted in terms of pilot pseudonoise sequence offsets measured in chips and are continually updated through instructions received from the base station. If the instructed pilot signal window size of the current search window is not below a pilot signal search window lower limit, e.g., 60 chips, the NO branch of decision block 106 is taken to step 108 where, in a conventional manner, the control registers 46 are configured to search according to the stored instruction configuration information. However, if the current search window is instructed to have a size below the pilot signal search window lower limit, the YES branch of decision block 106 directs operation to step 110.

In step 110, the CPU 60 configures the control registers 46 of the MSM ASIC 30 for a pilot signal search window having the size of the pilot signal search window lower limit, e.g., 60 chips, centered around the instructed window configuration. Thus, for example, if the instructed pilot signal search window size is 50 chips, the new size for the artificial pilot signal search becomes 60 chips, adding 5 chips to the upper end and 5 chips to the lower end of the 50 chip size originally instructed. Subsequently, after either step 110 or step 108, the MSM ASIC 30 is instructed to begin the pilot signal search process in step 112. As would be understood by one reasonably skilled in the art of the present invention, the searching process includes determining a list of energy hypotheses at distinct chip intervals and half intervals over the search window. When the search is complete, this information is stored in the result buffer 94, and a search completion interrupt is generated. Until that time, other processing occupies the CPU 60 as indicated in step 114. Furthermore, after the search completion interrupt is received, the process of FIG. 2 continues back at step 102 with the next search window.

Figure 3:
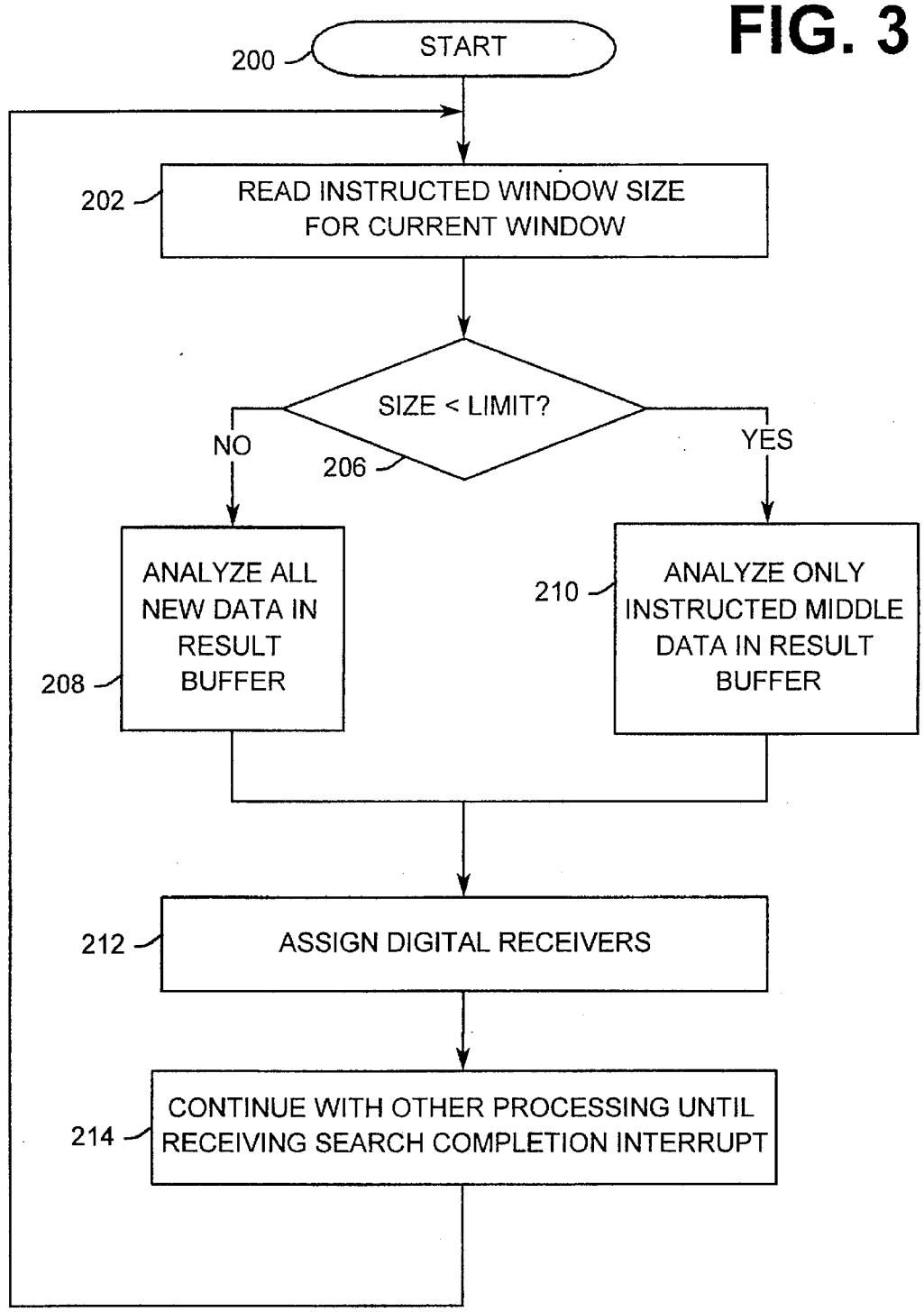
FIG. 3 is a flow chart representation of a pilot signal search analysis process for the elements shown in FIG. 1.

Refer now also to FIG. 3 for a flow chart representation of a pilot signal search analysis process for the elements shown in FIG. 1. After starting in step 200 as the result of an initial search completion interrupt, the instructed window size for the current window is again read in step 202. If the instructed window size is not below the pilot signal search window lower limit, the NO branch of decision block 206 directs operation to step 208 where all of the search result information from the last search stored in the result buffer 94 is analyzed. On the other hand, if the instructed window size is below the pilot signal search window lower limit, the YES branch of decision block 206 directs operation to step 210. In step 210, the CPU 60 analyzes only the search result information corresponding to the instructed window size. This portion of information is located in the middle of the search result information since the artificial window is centered around the instructed window. One example of a method for identifying search result information corresponding to the instructed window size for a pilot signal search window lower limit of 60 chips includes examining the range of memory locations between [(60−(instructed window size))/2] through [(60+(instructed window size))/2−1]. In this way, the remaining (outside the middle) search result information created as a result of the artificial window enlargement of step 110 in FIG. 2 is ignored, thus accomplishing the goal of essentially complying with the base station request to utilize data within a specified window without creating a large burden on the CPU 60. Finally, according to step 212, the CPU 60 determines how to assign the digital receivers based upon the search results, and other processing continues in step 214 until the next search completion interrupt is detected, at which point control loops back to step 202 to continually repeat the process of FIG. 3 for the next search window.

It should be understood that alternate embodiments of the present invention include moving functions disclosed herein into an alternate MSM ASIC. Window size comparisons and result data analyses would take place internal to such an MSM ASIC. Other alternate embodiments also include other window size lower limits based upon processor availability and speed.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the equivalents of all means- or step-plus-function elements in the claims are intended to include any structure, material, or acts for performing the function as specifically claimed and as would be understood by persons skilled in the art of this disclosure.

I claim:

1. A mobile station method of searching for base station pilot signal energy, said method comprising steps of:

receiving from a base station an instructed pilot signal window size;

defining a pilot signal window size lower limit;

comparing the instructed pilot signal window size to the pilot signal window size lower limit;

responsive to determining the instructed pilot signal window size to be below the pilot signal window size lower limit, configuring a pilot signal search with a window size equal to the pilot signal window size lower limit, searching for the pilot signal with the window size equal to the pilot signal window size lower limit, including generating result data, and analyzing only a middle portion of the result data corresponding to the instructed pilot signal window size.

2. The method of claim 1, wherein the window size lower limit equals 60 chips.

3. The method of claim 1, further comprising steps of responsive to determining the instructed pilot signal window size to be above the pilot signal window size lower limit, configuring a pilot signal search with a window size equal to the instructed pilot signal window size, searching for the pilot signal with the window size equal to the instructed pilot signal window size, including generating result data, analyzing all of the result data corresponding to the instructed pilot signal window size.

4. A pilot signal search apparatus comprising:

means for receiving from a base station an instructed pilot signal window size;

means for defining a pilot signal window size lower limit;

means for comparing the instructed pilot signal window size to the pilot signal window size lower limit;

means for responsive to determining the instructed pilot signal window size to be below the pilot signal window size lower limit for configuring a pilot signal search with a window size equal to the pilot signal window size lower limit, searching for the pilot signal with the window size equal to the pilot signal window size lower limit, including generating result data, and analyzing only a middle portion of the result data corresponding to the instructed pilot signal window size.

5. The apparatus of claim 4, wherein said defining means includes means for defining the pilot signal window size lower limit to be 60 chips.

6. The apparatus of claim 4, further comprising means responsive to determining the instructed pilot signal window size to be above the pilot signal window size lower limit for configuring a pilot signal search with a window size equal to the instructed pilot signal window size, searching for the pilot signal with the window size equal to the instructed pilot signal window size, including generating result data, analyzing all of the result data corresponding to the instructed pilot signal window size.

* * * * *